United States Patent [19]

Kawasaki et al.

[11] Patent Number: 4,845,699
[45] Date of Patent: Jul. 4, 1989

[54] ELECTRIC MECHANICAL TRANSDUCER AND OPTICAL TYPE PICKUP APPARATUS DRIVEN BY A MAGNETIC FIELD

[75] Inventors: Ryoichi Kawasaki, Gunma; Masami Shimizu, Ota; Kozo Suzuki, Gunma; Noriyoshi Oyama, Gunma; Tomio Uchida, Gunma, all of Japan

[73] Assignee: Sanyo Electric Co., Ltd., Osaka, Japan

[21] Appl. No.: 21,070

[22] Filed: Mar. 3, 1987

[30] Foreign Application Priority Data

Mar. 4, 1986 [JP] Japan .................................. 61-46791
Jul. 4, 1986 [JP] Japan .................................. 61-158436

[51] Int. Cl.⁴ .......................... G11B 7/09; G11B 7/135
[52] U.S. Cl. ........................................ 369/45; 369/44; 350/247; 350/255
[58] Field of Search .................................... 369/43–46, 369/112; 360/114; 350/6.3, 247, 255

[56] References Cited

U.S. PATENT DOCUMENTS

| 4,547,871 | 10/1985 | Sugiyama et al. ............... 369/44 |
| 4,568,142 | 2/1986 | Iguma ........................ 369/45 X |
| 4,615,585 | 10/1986 | Van Sluys et al. ................ 350/255 |
| 4,633,456 | 12/1986 | Luecke ........................ 369/44 X |
| 4,643,522 | 2/1987 | Takashima .................... 369/45 X |
| 4,646,283 | 2/1987 | Ito et al. ....................... 369/44 X |
| 4,658,390 | 4/1987 | Fujii et al. .................... 369/44 X |
| 4,679,904 | 7/1987 | Kurihara ...................... 369/45 X |
| 4,759,005 | 7/1988 | Kasahara ...................... 350/255 X |

FOREIGN PATENT DOCUMENTS

| 57-71532 | 5/1982 | Japan . |
| 57-127934 | 8/1982 | Japan . |
| 58-64648 | 4/1983 | Japan ........................... 369/45 |
| 58-64649 | 4/1983 | Japan ........................... 369/45 |

Primary Examiner—Alan Faber
Assistant Examiner—W. R. Young
Attorney, Agent, or Firm—Armstrong, Nikaido, Marmelstein, Kubovcik & Murray

[57] ABSTRACT

A small-sized electric mechanical transducer wherein plates are disposed to surround a bobbin in association with yokes. Magnetic passages are formed among the plates. Each of a pair of magnets drives the bobbin in accordance with the electric signals input into the driving coil. Also, an optical type pickup apparatus positively capable of the signal reading operation in which the lens holder is not out of shape even if the lens holder is driven in the focusing direction and the tracking direction, because the gravity center of the lens holder is conformed to the action point of the resultant force of the forces to be produced by the control signals to be input into the driving coil, and by the magnetic field of the magnetic circuit.

3 Claims, 1 Drawing Sheet

Fig. 1
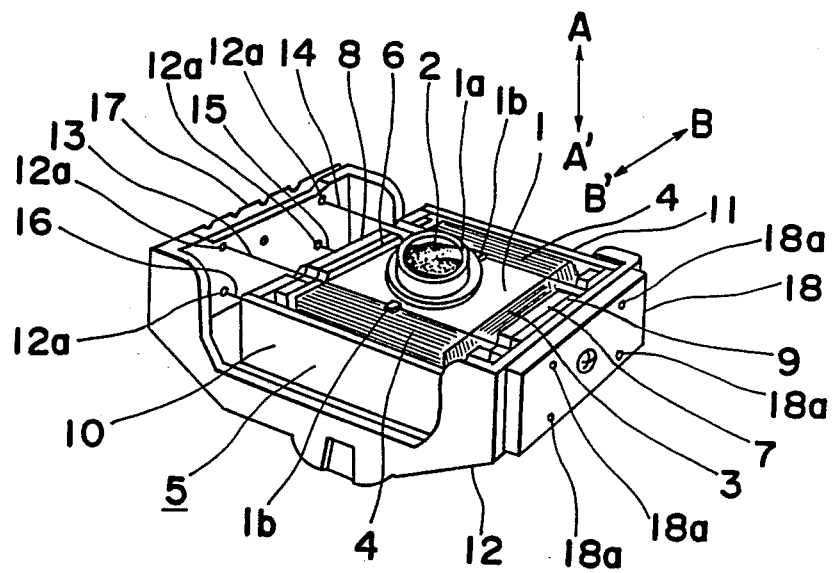
Fig. 2
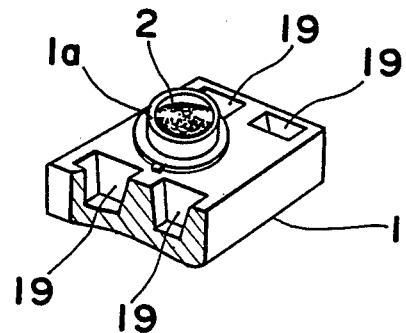
Fig. 3(a)
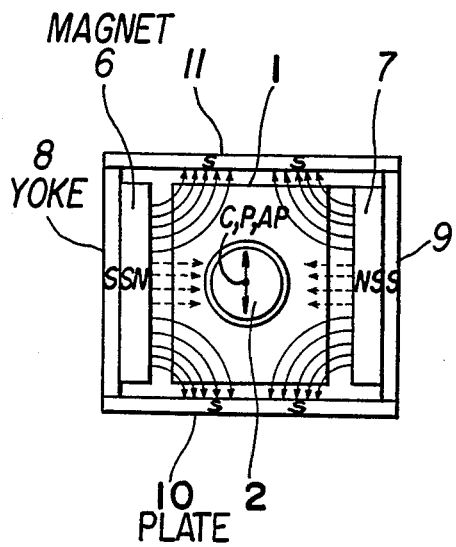
Fig. 3(b)

ELECTRIC MECHANICAL TRANSDUCER AND OPTICAL TYPE PICKUP APPARATUS DRIVEN BY A MAGNETIC FIELD

FIELD OF THE INVENTION

The present invention relates to an electric mechanical transducer which drives a bobbin which as coils engaged around it. The bobbin is driven in accordance with electric signals flowing into the coils. The coils are disposed in a magnetic field produced by an electric circuit. In particular, the invention relates to an electrical mechanical transducer which is ideal for driving an objective lens of an optical pickup to be used in reading a signal.

The present invention especially relates to an optical type of pickup apparatus for optically reading the signals recorded on a signal recording medium and particularly relates to an optical type of pickup apparatus which is capable of positively controlling the posture of the objective lens.

BACKGROUND OF THE INVENTION

There are apparatuses which read signals from the signal recording medium using an optical type pickup apparatus. A CD player is known as one representative among the apparatuses, which reproduces signals from compact discs (CD), which have projections called pits. The reproduced signals correspond to the digital signals formed on the signal face of the CD. In a CD player, it is necessary to perform a focusing controlling operation to control the optical beam in the optical axis direction, the so-called focusing direction, to correctly converge the optical beam produced from the optical type pickup apparatus on the signal face of the disc. It is also necessary to perform a tracking controlling operation to control the optical beam in the radial direction of the disc, the so-called tracking direction, to cause it to follow the signal track on the disc.

A method for controlling the position of the objective lens is necessary for the optical type pickup to perform the focusing control and the tracking control. As in, for example, Japanese Laid-Open Patent application Tokkaisho No. 57-71532 Publication, it is known in the optical type pickup that a lens holder for retaining the objective lens is provided as a bobbin. The focusing coil and the tracking coil are mounted on the lens holder. The lens holder is disposed in a given position in the magnetic field caused by the magnetic field in the electric mechanical transducer. The position of the objective lens retained by the lens holder is controlled with the lens holder being driven in accordance with the control signals flowing (input) into the focusing coil and the tracking coil.

As described in the publication, the optical type pickup was constructed so that the direction of the current flowing into the focusing coil and the direction of the current flowing into the tracking coil may become vertical to each other. Also, the direction of the magnetic flux, caused by the magnetic circuit, and the directions of the respective currents flowing into the focusing coil and the tracking coil may also become vertical to each other. Thus, as the magnetic circuit was required to be constructed so that the magnetic-pole face of the N polarity and the magnetic pole face of the S polarity might oppositely face each other with the focusing coil and the tracking coil being interposed, the yoke coupled to one magnetic-pole face of a magnet, constructing the magnetic circuit, had to be disposed in the space provided within the lens holder. As the optical passage of the optical beam was required on the lens holder to read the signals on the disc, the lens holder became larger, thus preventing the optical type pickup from becoming smaller.

Also, normally in an optical type pickup apparatus, where the objective lens is disposed with the lens holder, the tracking coil and the focusing coil are wound on the lens holder to feed the control signals to the tracking coil and the focusing coil to perform the tracking control and the focusing control. Thus, the optical type pickup apparatus was required to support the lens holder so that it could freely move in the tracking direction and the focusing direction in accordance with the input control signals.

As shown in FIG. 1 of Japanese Laid-Open Patent Application Tokkaisho No. 57-127934 Publication, an optical type pickup apparatus as described hereinabove, a method of using a support member composed of a viscometric elastic member was known to support the driven member as the lens holer. As the support member was elastic, torsion was caused by the force to be applied in the axial direction of the support member so that the posture of the lens holder could not be retained properly.

Also, a support apparatus as a cantilever type was conventionally known where, for example, four steel wires were disposed in parallel. One end of the steel wire was secured to the frame and the other end thereof was secured to the lens holder. The support apparatus, which is a cantilever type, may use a steel wire as the steel member which did not have elasticity in the axial direction. The support apparatus had an advantage in that the posture of the lens holder could be kept with respect to the force to be applied in the axial direction.

However, the cantilever type of support apparatus using the steel material (wire) had to retain the weight of the lens holder only with the wire. Thus, the wire had to be made thicker to increase the strength so that stiffness became larger, resonance frequency became higher, and thus the wire is vulnerable to vibration. Due to the unbalance of the driving force, the support position of the lens holder, during the tracking controlling or the focusing controlling, was concentrated on a single side of the lens holder. Thus, a rolling operation (rolling) was caused so that the correct posture could not be retained.

SUMMARY OF THE INVENTION

Accordingly, an object of the present invention is to provide an electric mechanical transducer comprising a bobbin, and a driving coil wound in a given direction being engaged with the bobbin. A pair of oppositely facing magnets grasp the bobbin therebetween. The yokes are additionally provided on one of the respective magnetic-pole faces of a pair of magnets and disposed to grasp the pair of magnets. Plates are in contact against or in connection with the yokes and surround the bobbin together with the yokes. Accordingly, the magnetic passage is formed between the plates to surround the bobbin together with a pair of magnets and yokes, so that the bobbin is driven in accordance with the electric signals input into the driving coil.

Another object of the present invention is to provide an optical type of pickup apparatus comprising a magnetic circuit for forming the magnetic field. A lens holder is disposed in the magnetic field of the magnetic circuit. The lens holder holds the objective lens. A driving coil is wound on the lens holder so that the lens holder may be driven in a given direction in the magnetic field of the magnetic circuit through the flow of the controlling signals. The center of gravity of the lens holder and the action point of the resultant force of the force produced by the control signals flowing into the magnetic field of the magnetic circuit and the driving coil, are caused to coincide with each other. Accordingly, the center of gravity of the lens holder is caused to coincide with the action point of the resultant force of the force caused by the control signals flowing into the magnetic field formed by the magnetic circuit and the driving coil to prevent the lens-holder from rolling.

BRIEF DESCRIPTION OF THE DRAWINGS

These and other objects and features of the present invention will become apparent from the following description taken in conjunction with the preferred embodiment thereof with reference to the accompanying drawings, in which:

FIG. 1 is a perspective view showing one embodiment of the present invention;

FIG. 2 is a partial sectional view showing the lens holder; and

FIG. 3(a) and 3(b) are respectively models of the plane and the side showing the directions of the magnetic flux of the magnetic circuit.

DETAILED DESCRIPTION OF THE INVENTION

Before the description of the present invention proceeds, it is to be noted that like parts are designated by like reference numerals throughout the accompanying drawings.

Embodiment

Referring now to the drawings, there is shown in FIG. 1 an electric mechanical transducer according to the embodiment of the present invention. The transducer includes a lens holder 1 provided with an objective lens 2 within an integrally molded cylinder 1a provided on a plane. Focusing coils 3 are engaged with the lens holder 1. Tracking coils are engaged with the lens holder 1. A pair of permanent magnets 6, 7 have the pole-face of the N polarity provided opposite thereto and have the lens holder 1 grasped therebetween. Yokes 8, 9 additionally provided the pole-faces of the respective S polarities of the pair of permanent magnets 6, 7. The yokes are disposed with the pair of permanent magnets 6, 7 grasped therebetween. Plates 10, 11 are respectively in contact against the end faces of the yokes 8, 9 and are composed of the yokes 8, 9 and wrought iron surrounding the lens holder 1. A frame 12 has the pair of permanent magnets 6, 7, the yokes 8, 9, the plates 10, 11 mounted therein. Wires 13 through 16 have one end secured to the frame 12. The ends are inserted into holes 12 and into holes in the frame in the hole member 18. The central portion of the wires is secured into the lens holder 1. A print base plate 17 is used to secure the respective other ends of the wires 13 through 16. A hole member 18 has holes 18a into which the other ends of the wires 13 through 16 are inserted.

A pair of permanent magnets 6, 7, the yokes 8, 9, the plates 10, 11 constitute the magnetic circuit 5 of the electric mechanical transducer. The magnetic circuit 5 produces the magnetic flux as shown in arrows of solid lines and broken lines of FIG. 3(a) and 3(b), which show the model plan view and the side face view of the optical type of pickup of FIG. 1. Namely, the plates 10, 11 are in contact against the respective end faces of the yokes 8, 9 which are provided to be brought respectively into contact against the pole-faces of the S-polarities of the permanent magnets 6 and 7. As the plates 10, 11 are magnetized into the S polarity, magnetic flux (arrows of the solid lines) is created in the circular arcs from the pole-faces of the respective polarities of the permanent magnets 6, 7 to each of the plates 10 and 11. The flux is in parallel to the plane of the lens holder 1 as shown in FIG. 3(a). Since the total amount of magnetic flux is proportion to the product of the magnetic force and the sectional area of plates 10, 11, it is proportional to the sectional area of the plates when the magnetic force is determined. Thus, when the sectional areas of the plates 10, 11 are less than the given value related to the magnetic forces of the permanent magnets 6 and 7, the magnetic flux is created (the arrows of the broken lines) in the circular arcs to each of the yokes 8, 9 from the pole-faces of the respective N polarities of the permanent magnets 6 and 7 shown in FIG. 3(b) from the central vicinity of the permanent magnets 6, 7 away from either of the plates 10, 11, and the flux is parallel to the longitudinal direction of the plates 10, 11 in FIG. 3(a). The plates 10, 11 of the optical pickup of FIG. 1 are set into a sectional area such as to create the magnetic flux.

Also, the focusing coil 3 and the tracking coil 4 are engaged with the lens holder 1. As shown in FIG. 2, the focusing coil 3 is wound to surround one side face of the lens holder 1. The tracking coil 4 is wound on two sides of the lens holder, grasping the objective lens 2 so that the tracking coil may go round to the reverse face from the front face of the lens holder 1 and return to the front face again.

Furthermore, the lens holder 1 has a plurality of holes drilled from the top face. The cylinder 1a, with the objective lens 2 being supported from it, is formed as shown in the partial sectional view of FIG. 2. The holes 19 are gradually narrowed from the opening to the rear and is closed without being therethrough. The holes are symmetrically provided with respect to the cylinder 1a centrally formed. Thus, the lens holder 1 has its center of gravity deviated downwardly of the center. The lens holder 1 is to become the center of gravity with the objective lens 2 engaged with the cylinder 1a.

When the optical type of pickup is constructed as described hereinabove, the lens holder 1, the focusing coil 3 and the tracking coil 4 are disposed in the given position of the magnetic circuit 5. Thereafter, the wires 13 through 16 which are fixedly soldered at the respective one end on the print base plate 17 are inserted into the holes 12a of the frame 12 from the outside of the frame 12, and are inserted into the holes of the mounting portion 1b of the lens holder 1. Thereafter the wires are inserted for engagement into the holes of the frame 12 and into the holes 18a of the hole member 18. The mounting portion 1b of the lens holder 1 is bonded with the wires 13 through 16 to complete the assembling operation. At this time, the focusing coil 3 has two parallel faces respectively provided oppositely to the pole-faces of the N polarities of the permanent magnets 6, 7. The tracking coil 4 has the portions, which are adhered on the side face of the lens holder 1, respectively provided oppositely to the pole-faces of the polarities of the N polarities of the permanent magnets 6, 7. Also, the plates 10, 11 are connected with the pole-faces of the S polarities of the permanent magnets 6 and 7 through the yokes 8, 9, so that the magnetic circuit 5 causes the magnetic flux shown by the arrows of the solid lines and the broken lines of FIGS. 3(a) and 3(b), which show the model plan and side views of the optical type pickup of FIG. 1. Thus, the objective lens 2 which is retained on the lens holder 1, may be driven in the focusing direction and the tracking direction in accordance with the central signals to be fed into the focusing coil 3 and the tracking coil 4. Namely, in the portions opposite to the respective pole-faces of the permanent magnets 6 and 7 of the focusing coil 3, the control signals flow in the upper, and lower directions in FIG. 3(a). The magnetic circuit 5 is to produce the magnetic flux in the arrow direction of the broken line of FIG. 3(a) with respect to the focusing coil 3 from the central vicinity of the permanent magnets 6, 7. The lens holder 1 is to move in the focusing direction onto one or the other side (the arrow A–a' direction in FIG. 1) in FIG. 3(a). The circular magnetic flux to be produced from the magnetic circuit 5 shown in the solid line of FIG. 3(a) does not influence the movement of the lens holder 1 if the control signals do not flow to the focusing coil 3. Namely, when the magnetic flux is directed at the plate 10 from, for example, the permanent magnet 6 in the adjacent side-face of the lens-holder 1, the relation of the current between the magnetic flux and the current flowing into the focusing coil 3 reverses, so that the equal forces which are mutually opposite in direction are applied upon the lens holder 1 by the magnetic flux. The same things occurs with the magnetic flux in the respective directions shown in the solid line of FIG. 3(a).

On the other hand, in the portions opposite to the respective pole-faces of the permanent magnets 6, 7 of the tracking coil 4, the control signals flow in the upper, and lower directions as shown in FIG. 3(b). The magnetic circuit 5 is to cause the magnetic flux in the directions of the arrows shown with solid lines and the broken lines of FIG. 3(b), so that the lens holder 1 is to move in the tracking direction onto one side or the other side (the arrow B–B' direction in FIG. 1) in FIG. 3(b). Accordingly, the proper control signals flow into the focusing coil 3 and the tracking coil 4 so that the objective lens 2, retained on the lens holder 1, may be driven into the desired position.

As the magnetic flux in the direction of the arrows with which the solid lines of FIG. 3(b), namely, the circular magnetic flux in the arrow directions of the solid lines of FIG. 3(a), become so high in the magntic-flux density in the portions near the plates 10 and 11 that the magnetic-flux density becomes high as it comes closer to the corner of the side face of the lens holder 1 opposite to the respective pole-faces of the permanent magnets 6, 7. Thus, the magnetic fluxes effectively operate upon the current flowing in to the tracking coil 4. Accordingly, the sensitivity of the movement into the tracking direction of the lens holder 1 becomes improved.

Also, the mounting portion 1b, which is connected with the wires 13 through 16 of the lens holder 1, is formed in the central-point position on the side in the direction along which the wires 13 through 16 of the lens holder 1 are extended. There are four mounting portions on the lens holder in symmetrical positions with respect to the center of the lens holder 1. The support point P which becomes the central point of the respective combination of the wires 13 through 16, is located at the center of the lens holder 1. Also, the focusing coil 3 and the tracking coil 4 are wound in the lens holder 1. The focusing coil 3 is wound to surround the side face of the lens holder 1. The tracking coil 4 is wound on two sides of the lens holder to hold the objective lens 2 so that it may turn to the rear face from the front face of the lens holder 1 and back again. In this case, the focusing coil 3 and the tracking coil 4 are symmetrical in face with respect to the imaginary face to be formed through the connection of the four mounting portions 1b of the lens holder. Also, the magnetic circuit 5 has permanent magnets 6, 7 yokes 8, 9 and plates 10, 11 disposed so that the face symmetrical magnetic field may be produced with respect to the imaginary face. Thus, the operation point of the resultant forces of the force, to be produced by the magnetic field of the magnetic circuit 5 and the control signals flowing into the focusing coil 3 and the tracking coil 4, is considered to be in the focusing direction and the tracking direction and to be positioned at the center of the lens holder 1. Namely, the center of gravity C, the support point P, and the action point AP conform to one another at the center of the lens holder 1. Accordingly, the lens holder is not out of shape even if the lens holder 1 is driven in the focusing direction in the tracking direction to control the focus of the light beam, so that the objective lens 2 retains the proper posture with respect to the signal face.

As is clear from the foregoing description, according to the arrangement of the present invention, the plates are disposed to surround the yokes and the bobbin. Magnetic passages are formed between the plates and each of a pair of magnets to drive the bobbin in accordance with the electric signals flowing into the driving coil, so that small sized electric mechanical transducer may be provided.

Also, as the center of gravity of the lens holder conforms to the action point of the resultant force of the forces to be produced by the control signals flowed into the driving coil, and by the magnetic field of the magnetic circuit, and optical type pickup apparatus may be provided which is capable of a signal reading operation in which the lens holder is not out of shape even if the lens holder is driven in the focusing direction and the tracking direction.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

We claim:

1. An electric mechanical transducer comprising:
   a driving coil wound in a given direction, said driving coil including a focusing coil and a tracking coil;
   a bobbin engaged with said driving coil, said focusing coil being wound to surround only one side face of said bobbin and said tracking coil being wound to surround only two other side faces of said bobbin;
   a pair of opposite magnets disposed on two opposed sides of said bobbin, said pair of magnets having pole-faces;
   yokes provided on one of the pole faces of said pair of magnets, said yokes holding said pair of magnets therebetween;

plates disposed on two other opposed sides of said bobbin in contact with said yokes, said plates and said yokes surrounding the sides of said bobbin, wherein magnetic passages are formed between second-pole faces of the pair of magnets and the plates, said magnetic field driving said bobbin in accordance with electric signals input into said driving coil.

2. An optical type pickup apparatus wherein optical beams for a signal reading operation are focused onto a signal face of a record medium by driving an objective lens, the optical type pickup apparatus comprising:

a magnetic circuit forming a magnetic field;

a lens holder disposed in the magnetic field of said magnetic circuit and having said objective lens retained therein, said lens holder being provided with at least one hole for displacing a center of gravity of said lens holder and lens;

a driving coil wound around said lens holder so that said lens holder is driven in a given direction by the magnetic field of said magnetic circuit through use of control signals, said driving coil including a focusing coil, wound to surround only one side face of said lens holder, and a tracking coil, wound to surround only two other side faces of said lens holder, wherein said at least one hole displaces the center of gravity of said lens holder and lens to coincide with an action point of a force produced by the magnetic field of said magnetic circuit and the control signals input into said driving coil.

3. An optical type pickup apparatus according to claim 2 wherein said at least one hole extends part way into said lens holder and is gradually narrowed from an opening in a top face of said lens holder toward a rear face of said lens holder.

* * * * *